(12) United States Patent
Kobayashi et al.

(10) Patent No.: US 10,277,764 B2
(45) Date of Patent: Apr. 30, 2019

(54) POWER SUPPLY APPARATUS AND IMAGE FORMING APPARATUS

(71) Applicant: CANON KABUSHIKI KAISHA, Tokyo (JP)

(72) Inventors: Junya Kobayashi, Suntou-gun (JP); Mitsuhide Murofushi, Tagata-gun (JP); Minoru Hayasaki, Mishima (JP); Keisuke Nakano, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/815,144

(22) Filed: Nov. 16, 2017

(65) Prior Publication Data

US 2018/0146109 A1    May 24, 2018

(30) Foreign Application Priority Data

Nov. 24, 2016   (JP) .................. 2016-227808

(51) Int. Cl.
*H04N 1/00*     (2006.01)
*H02M 7/219*    (2006.01)
(Continued)

(52) U.S. Cl.
CPC .......... *H04N 1/00899* (2013.01); *H02M 1/44* (2013.01); *H02M 3/33507* (2013.01);
(Continued)

(58) Field of Classification Search
CPC ........ H02M 7/517; H02M 7/219; H02M 7/12; H02M 7/217; H02M 1/4258; H02M 1/32;
(Continued)

(56) References Cited

U.S. PATENT DOCUMENTS 8,830,703 B2    9/2014  Murofushi
8,977,157 B2    3/2015  Odate et al.
(Continued)

FOREIGN PATENT DOCUMENTS

JP    2012-244878 A    12/2012

OTHER PUBLICATIONS

U.S. Appl. No. 15/810,864, filed Nov. 13, 2017. Applicant: Keisuke Nakano.

*Primary Examiner* — Jue Zhang
*Assistant Examiner* — Kevin H Sprenger
(74) *Attorney, Agent, or Firm* — Venable LLP

(57) ABSTRACT

The power supply apparatus includes a detecting unit that has a first detecting device, a second detecting device and a third detecting device, detects a current flowing into the primary winding, and outputs a voltage corresponding to the current, and a control unit that controls a switching operation of the switching element, an output voltage which the detecting unit outputs to the control unit includes a first output voltage at which the control unit stops an operation of the switching element at a time of the second state, a second output voltage at which the control unit stops the operation of the switching element at a time of the first state, a third output voltage at which the second detecting device is brought into a conducting state, and a fourth output voltage at which the third detecting device is brought into a conducting state.

18 Claims, 12 Drawing Sheets

(51) Int. Cl.
  *H02M 1/44* (2007.01)
  *H02M 3/335* (2006.01)
  *H02M 1/36* (2007.01)
  *H02M 1/42* (2007.01)
  *H02M 1/00* (2006.01)

(52) U.S. Cl.
  CPC ........ *H02M 7/219* (2013.01); *H04N 1/00907* (2013.01); *H02M 1/36* (2013.01); *H02M 1/4258* (2013.01); *H02M 2001/0006* (2013.01); *H02M 2001/0032* (2013.01); *Y02B 70/16* (2013.01)

(58) Field of Classification Search
  CPC .... H02M 1/36; H02M 1/4208; H02M 1/4233; H02M 1/4225; H02M 3/1584; H02M 3/156; H02M 3/33507; H02M 3/33515; H02M 3/33569; H02M 3/335; H02M 3/33538; H02M 3/33523; H02M 3/3385; H02M 3/33592; H02M 3/33576; H02M 3/33561; H02M 3/1563; H02M 2001/007; H02M 2001/0045; H02M 2001/0032; H02M 2001/0006; H02M 5/4585; G05F 1/32; G05F 1/34; G05F 1/24; G05F 1/1563; G05F 1/575; G05F 1/56; G05F 1/565; G05F 1/573; G05F 1/569; G05F 1/5735; G05F 1/567; G05F 1/445; G05F 1/33; G05F 1/38; Y02B 70/1466; Y02B 70/1433; Y02B 70/126; Y02B 70/1441; Y02B 70/1475; Y02B 70/16; H04N 1/00899; H04N 1/00907

See application file for complete search history.

(56) References Cited

U.S. PATENT DOCUMENTS

| | | | |
|---|---|---|---|
| 2007/0014129 A1* | 1/2007 | Inukai | H02M 3/33515 363/21.01 |
| 2007/0059016 A1* | 3/2007 | Sato | G03G 15/80 399/88 |
| 2010/0149840 A1* | 6/2010 | Hayasaki | H02M 3/3381 363/21.09 |
| 2012/0134707 A1* | 5/2012 | Inukai | G03G 15/80 399/88 |
| 2012/0301172 A1 | 11/2012 | Odate et al. | |
| 2013/0236203 A1 | 9/2013 | Nakajima et al. | |
| 2014/0301114 A1* | 10/2014 | Matsumoto | H02M 3/33523 363/21.12 |
| 2015/0055972 A1* | 2/2015 | Kosaka | G03G 15/80 399/88 |

\* cited by examiner

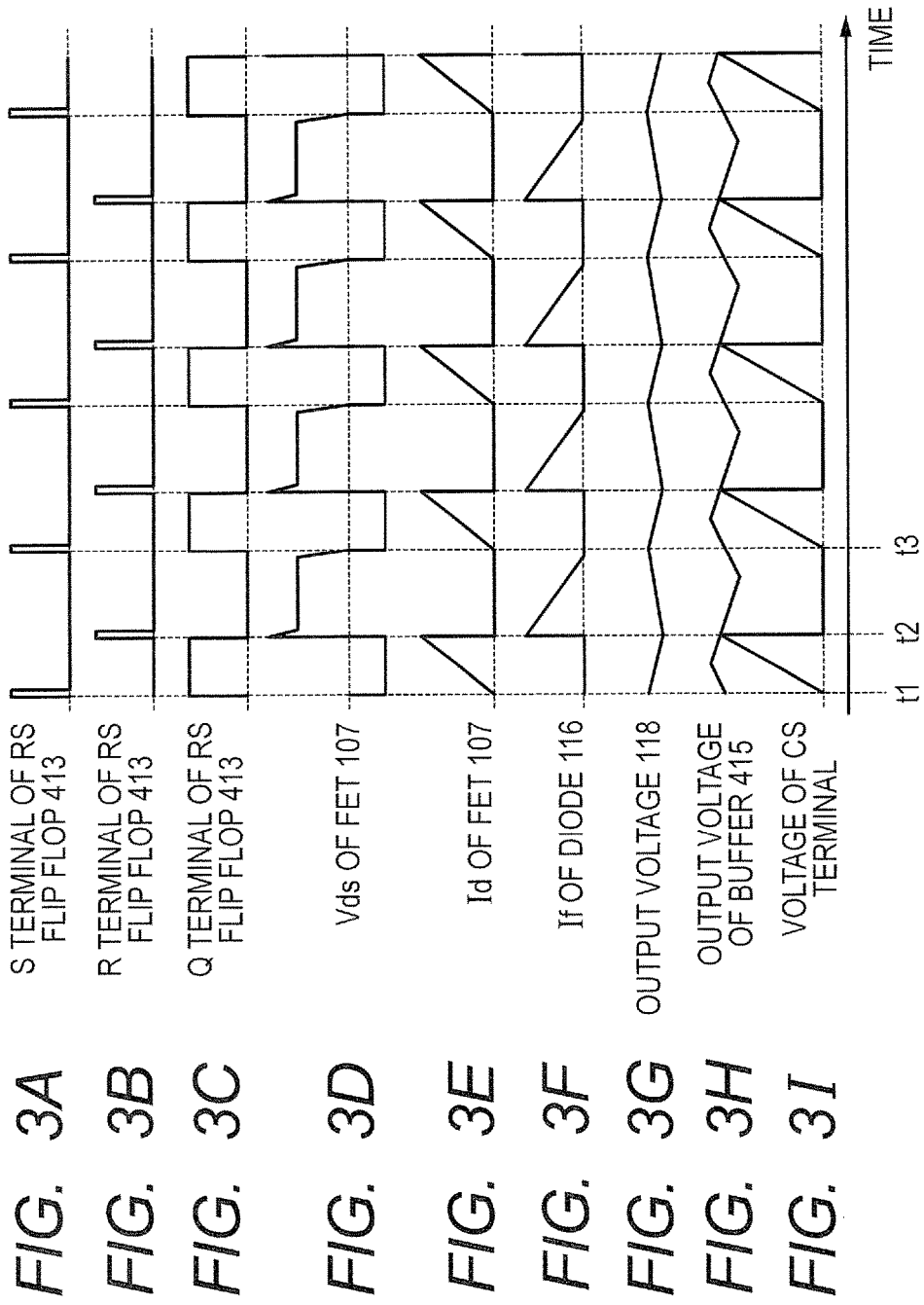

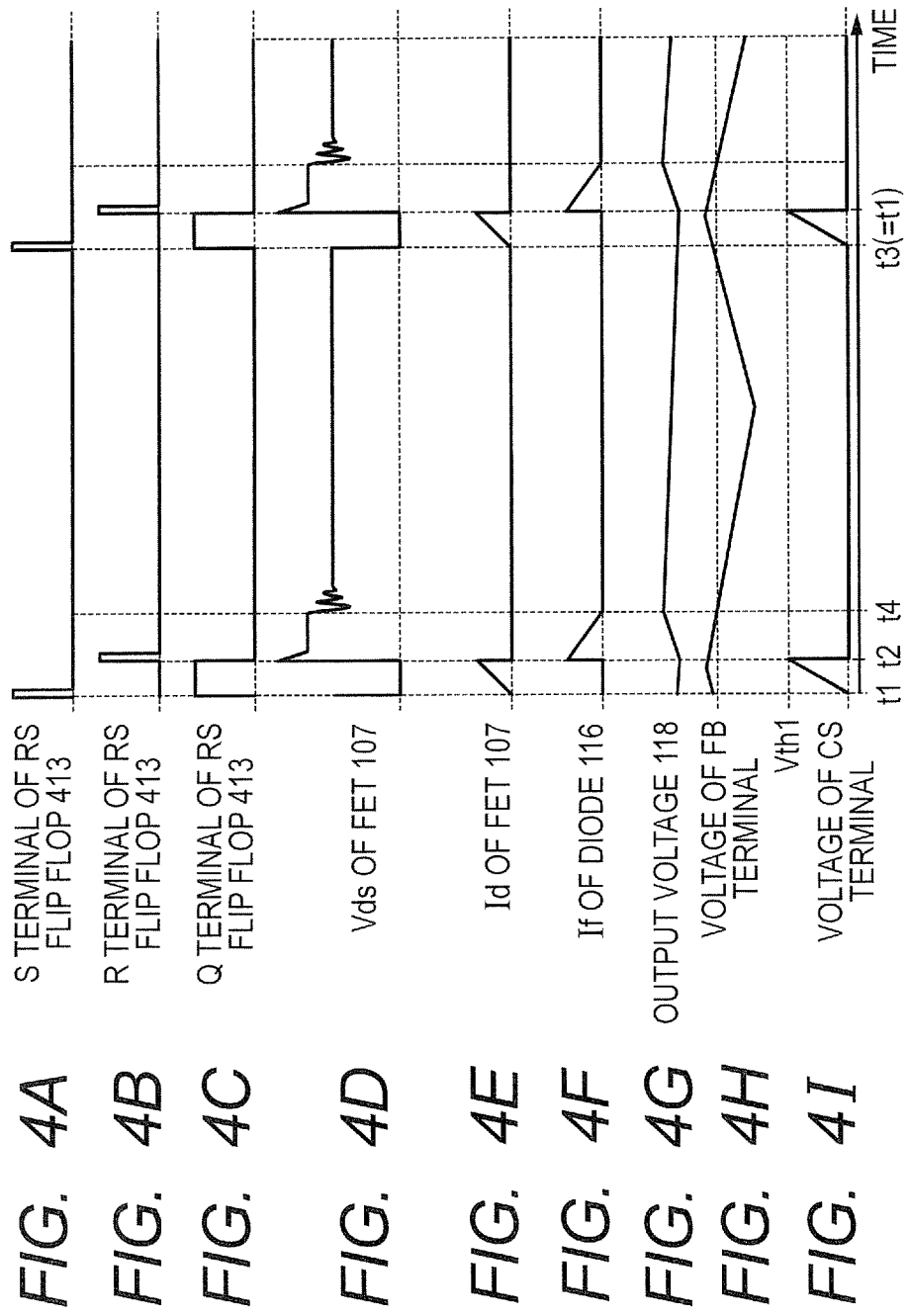

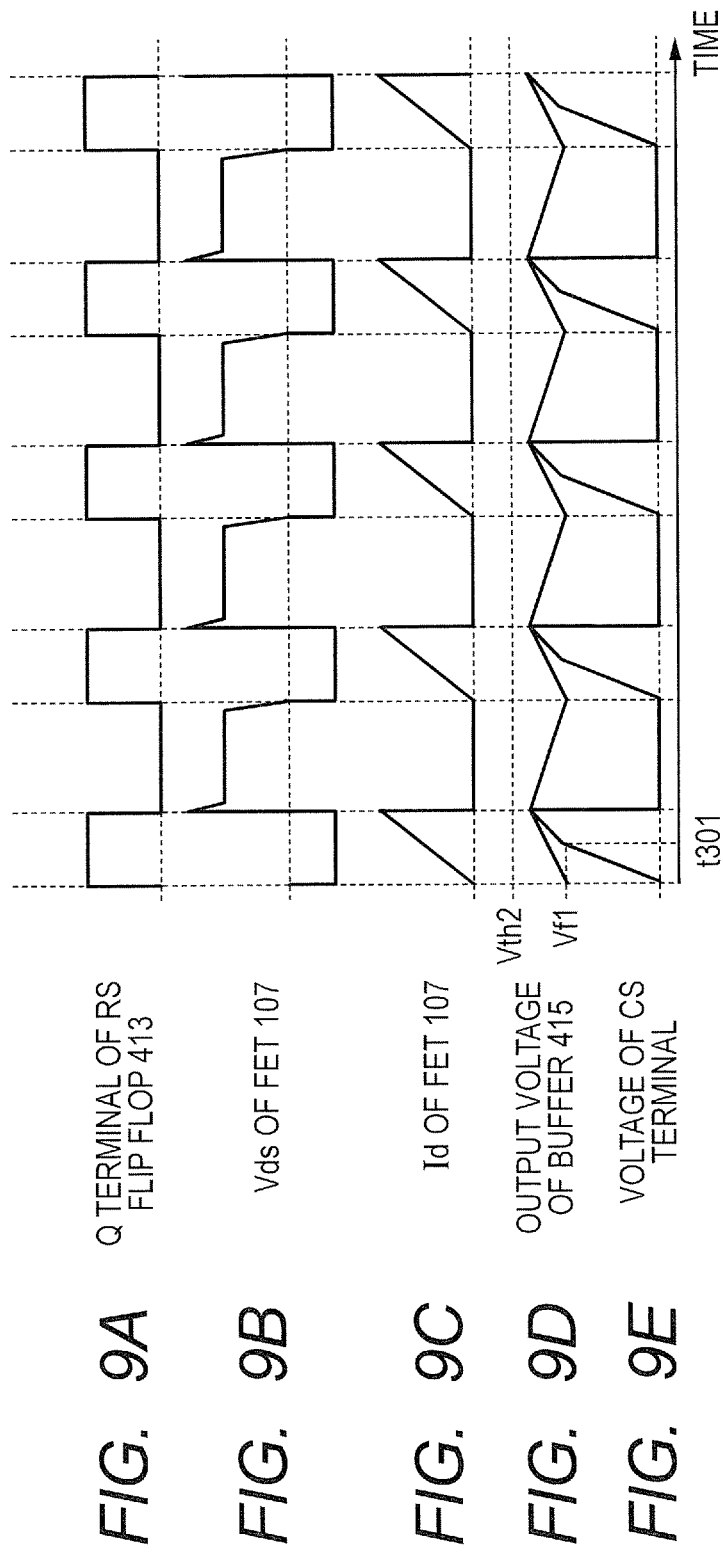

POWER SUPPLY APPARATUS AND IMAGE FORMING APPARATUS

BACKGROUND OF THE INVENTION

Field of the Invention

The present invention relates to a power supply apparatus for converting an alternating current voltage to a direct current voltage, and an image forming apparatus including the power supply apparatus.

Description of the Related Art

In a conventional flyback switching power supply apparatus, the number of switching times of a switching element that switches the transformer is decreased in order to reduce power consumption, in a low load state. In Japanese Patent Application Laid-Open No. 2012-244878, the power consumption at a low load time is reduced by decreasing the number of switching times of a field effect transistor (FET) which is a switching element that switches the transformer.

However, when the number of switching times of the switching element is decreased, the number of switching times per unit time comes close to an audible frequency. Further, in the same load state, it is necessary to increase the amount of current that is passed to the switching element by switching at one time, so that there has been the problem that a beat noise is generated from the transformer. Further, when terminals are short-circuited due to an incidental failure of the switching element, an excessive current flows and is likely to break the peripheral elements.

SUMMARY OF THE INVENTION

An aspect of the present invention can reduce a vibration sound generated from a transformer at a low load operation time. Further, the aspect of the present invention is a power supply apparatus that can minimize breakage of peripheral components due to an incidental failure of a switching element.

Another aspect of the present invention is a power supply apparatus including a transformer having a primary winding and a secondary winding, a switching element for switching a current flowing in the primary winding of the transformer, wherein the power supply apparatus is operable in a first state of outputting a predetermined voltage from the secondary winding, and a second state of outputting a voltage lower than the predetermined voltage, a detecting unit that has a first detecting device, a second detecting device and a third detecting device that are connected in parallel with one another, detects a current flowing into the primary winding, and outputs a voltage corresponding to the current; and a control unit that controls a switching operation of the switching element, in accordance with the voltage which is output by the detecting unit, wherein an output voltage which the detecting unit outputs to the control unit includes a first output voltage at which the control unit stops the switching operation of the switching element at a time of the second state, a second output voltage at which the control unit stops the switching operation of the switching element at a time of the first state, a third output voltage at which the second detecting device is brought into a conducting state, and a fourth output voltage at which the third detecting device is brought into a conducting state, and satisfies a relationship of the first output voltage<the third output voltage<the second output voltage<the fourth output voltage.

A further aspect of the present invention is an image forming apparatus including an image forming unit for forming an image on a recording material and a power supply apparatus that supplies electric power to the image forming unit, wherein the power supply apparatus including a transformer having a primary winding and a secondary winding, and a switching element for switching a current to the primary winding of the transformer, wherein the power supply apparatus is operatable in a first state of outputting a predetermined voltage from the secondary winding, and a second state of outputting a voltage lower than the predetermined voltage, a detecting unit that has a first detecting device, a second detecting device and a third detecting device that are connected in parallel with one another, detects a current flowing into the primary winding, and outputs a voltage corresponding to the current, and a control unit that controls a switching operation of the switching element, in accordance with the voltage which is output by the detecting unit, wherein an output voltage which the detecting unit outputs to the control unit includes a first output voltage at which the control unit stops the switching operation of the switching element at a time of the second state, a second output voltage at which the control unit stops the switching operation of the switching element at a time of the first state, a third output voltage at which the second detecting device is brought into a conducting state, and a fourth output voltage at which the third detecting device is brought into a conducting state, and satisfies a relationship of the first output voltage<the third output voltage<the second output voltage<the fourth output voltage.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, 3H and 3I are graphs illustrating operation waveforms of a switching power supply apparatus.

FIGS. 4A, 4B, 4C, 4D, 4E, 4F, 4G, 4H and 4I are graphs illustrating operation waveforms of the switching power supply apparatus at a low load time.

FIGS. 9A, 9B, 9C, 9D and 9E are graphs illustrating an operation waveform at a normal time of the switching power supply apparatus of embodiment 1.

DESCRIPTION OF THE EMBODIMENTS

Preferred embodiments of the present invention will now be described in detail in accordance with the accompanying drawings.

[Configuration and Operation of Ordinary Switching Power Supply Apparatus]

Figure 1:
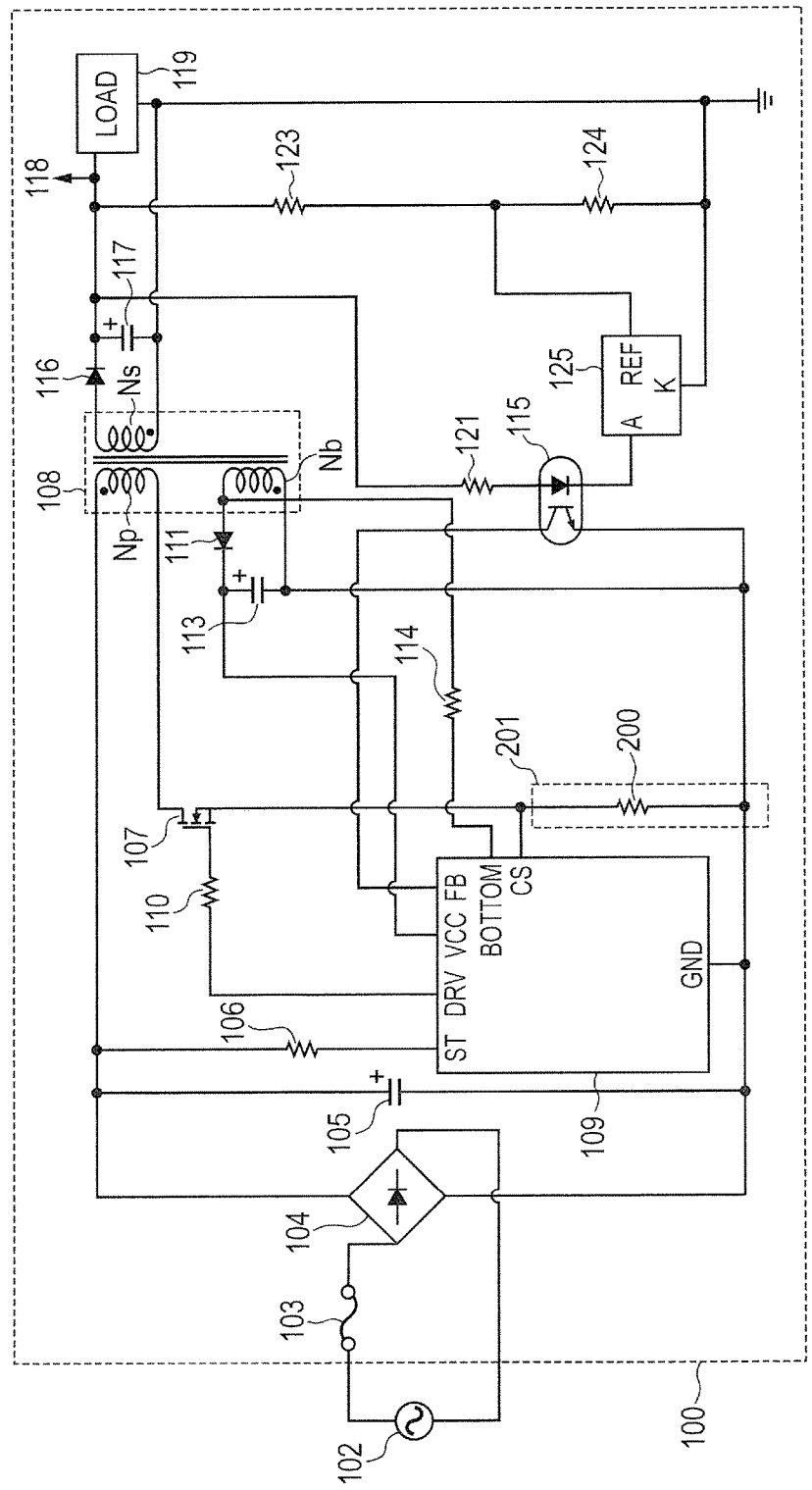
FIG. 1 is a diagram illustrating a circuit configuration of an ordinary switching power supply apparatus.

First, for comparison with circuits of embodiments described later, a configuration and an operation of an ordinary switching power supply apparatus 100 are described. FIG. 1 is a diagram illustrating a circuit configuration of the ordinary switching power supply apparatus 100.

(Operation at Start-Up Time of Power Supply IC)

An alternating current voltage input from a commercial alternating current power supply 102 is subjected to full-wave rectification via a current fuse 103 for circuit protection and a rectifier diode bridge 104, and is charged into a primary smoothing capacitor 105 (hereunder, referred to as a smoothing capacitor 105) as a direct current voltage. Further, when the direct current voltage charged in the smoothing capacitor 105 is supplied to an ST terminal of a power supply IC 109 via a start-up resistor 106, and is charged to a predetermined voltage, the power supply IC 109 is started up. When the power supply IC 109 which is a control unit is started up, a high level signal is output to a gate terminal of an FET 107 that is a switching element, via a resistor 110 from a DRV terminal. When the FET 107 is brought into a conducting state, the direct current voltage of the smoothing capacitor 105 is applied to both ends of a primary winding Np of a transformer 108. At this time, a voltage is also induced at a secondary winding Ns side of the transformer 108, but the voltage makes an anode side of the diode 116 negative, so that the diode 116 is not brought into a conducting state, and the voltage is not transmitted to a secondary side of the transformer 108. Likewise, a voltage is also induced at an auxiliary winding Nb side of the transformer 108, but the voltage makes an anode side of a diode 111 negative, so that the diode 111 is not brought into a conducting state, and a current does not flow in the auxiliary winding Nb. Accordingly, a current flowing in the primary winding Np of the transformer 108 is only an exciting current of the transformer 108, and energy that is proportional to a square of the exciting current is stored in the transformer 108. Note that the exciting current increases proportionally to time.

When an output from the DRV terminal of the power supply IC 109 reduces to a low level next, the FET 107 is brought into a non-conducting state from the conducting state. When the FET 107 is brought into a non-conducting state, a voltage with reversed polarity from polarity at a conducting time of the FET 107 is induced in each of the windings of the transformer 108. As a result, a voltage that makes the anode side of the diode 116 positive is induced in the secondary winding Ns of the transformer 108, and the diode 116 is brought into a conducting state. Energy accumulated in the transformer 108 is rectified and smoothed by the diode 116 and the smoothing capacitor 117 which configure a rectifying and smoothing circuit to be a direct current output voltage 118, and is supplied to a load 119. Further, a voltage that makes an anode side of the diode 111 positive is induced in the auxiliary winding Nb, and the diode 111 is brought into a conducting state. A capacitor 113 is charged via the diode 111, and the direct current voltage charged in the capacitor 113 is supplied to a VCC terminal of the power supply IC 109.

(Control of Output Voltage)

In the switching power supply apparatus in FIG. 1, voltage control of the output voltage 118 is performed as follows. First, the output voltage 118 which is generated at the secondary side of the transformer 108 is divided by regulation resistors 123 and 124, and is input to a REF terminal of a shunt regulator 125. A feedback signal corresponding to a voltage level which is input to the REF terminal of the shunt regulator 125 is output from an A terminal of the shunt regulator 125. The shunt regulator 125 is connected to a photo coupler 115, and the feedback signal which is output from the shunt regulator 125 is input to an FB terminal of the power supply IC 109 via the photo coupler 115. A resistor 121 is a resistor for restricting a current that flows in an LED of the photo coupler 115. The power supply IC 109 can perform control of a stable output voltage by performing switching control of the FET 107 based on the feedback signal which is input from the FB terminal. Note that reference signs in the power supply IC 109 in FIG. 1 are names of the respective terminals.

[Configuration and Operation of Power Supply Control IC]

Figure 2:
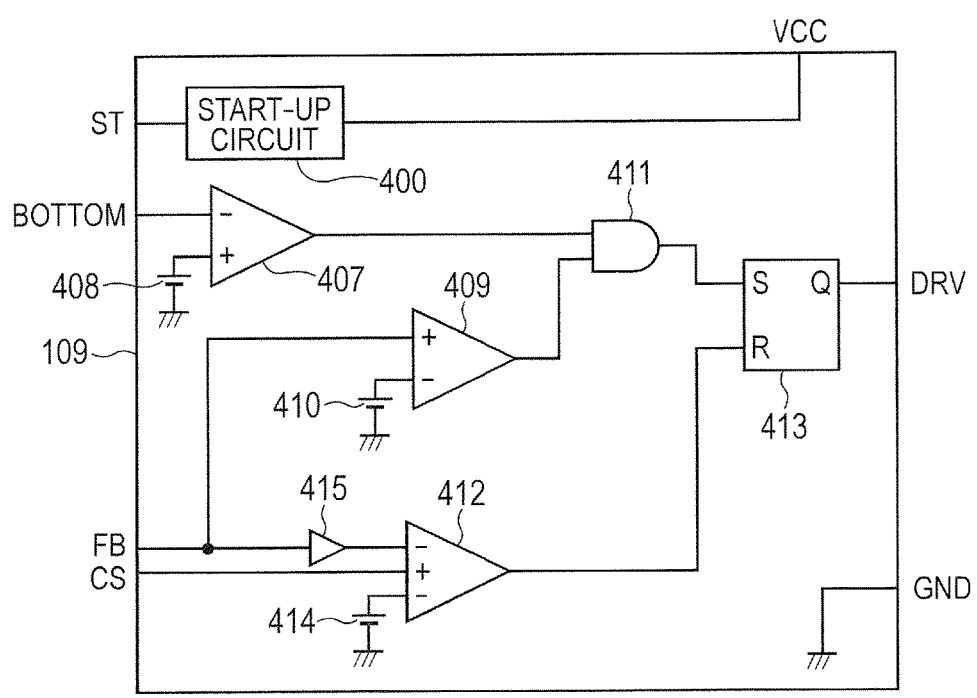
FIG. 2 is a block diagram illustrating an internal configuration of a power supply IC.

Next, a configuration and an operation of the power supply IC 109 are described. Here, as an example, the power supply IC 109 which operates in a frequency unfixed, duty unfixed, and current control mode is described. In FIG. 2, a start-up circuit 400 is a start-up circuit of the power supply IC 109, and starts up the power supply IC 109 when the voltage which is input via the ST terminal immediately after start-up of the switching power supply apparatus 100 reaches a predetermined voltage. Once the power supply IC 109 is started up, the power supply IC 109 is driven by the direct current voltage that is input via the VCC terminal from the capacitor 113 thereafter. A BOTTOM terminal is a terminal for monitoring a voltage Vds between a drain terminal and a source terminal of the FET 107. The FB (feedback) terminal is a terminal to which the feedback signal indicating a variation of the output voltage 118 is input via the photo coupler 115. A CS terminal is a terminal for monitoring a current Id flowing in the drain terminal of the FET 107, and voltages that are generated at both ends of a current detection resistor 200 configuring a current detection unit 201 are input to the CS terminal. Further, when the voltage which is input to the CS terminal exceeds a predetermined voltage, the power supply IC 109 stops a switching operation of the FET 107. The DRV terminal is connected to a Q terminal of an RS flip flop 413 and the gate terminal of the FET 107, and controls the switching operation of the FET 107 by outputting an output of the Q terminal to the gate terminal of the FET 107.

A comparator 407 outputs a high level signal to an AND circuit 411, when the voltage which is input from the BOTTOM terminal (the voltage Vds between the drain terminal and the source terminal of the FET 107) becomes lower than a reference voltage 408. Further, when the voltage which is input from the BOTTOM terminal is higher than the reference voltage 408, the comparator 407 outputs a low level signal to the AND circuit 411. When the voltage which is input from the FB terminal becomes higher than a reference voltage 410, a comparator 409 outputs a high level signal to the AND circuit 411, and when the voltage which is input from the FB terminal is the reference voltage 410 or less, the comparator 409 outputs a low level signal to the AND circuit 411. The outputs from the comparator 407 and the comparator 409 are input to the AND circuit 411, and a logical sum (AND) of the two input signals are output to a S (set) terminal of the RS flip flop 413. A buffer 415 converts a level of the voltage which is input from the FB terminal, and outputs the voltage to an inverting input (−) terminal of a comparator 412. The comparator 412 compares the voltage which is input from the FB terminal and is level-converted by the buffer 415 and the input voltage of the CS terminal, outputs a high level signal when the input voltage of the CS terminal is high, and outputs a low level signal when the output voltage of the buffer 415 is high. Further, when the voltage which is input from the CS terminal becomes higher than a reference voltage 414, the comparator 412 outputs a high level signal in order to stop an oscillating operation of the power supply IC 109. The RS flip flop 413 sets the output of the Q terminal at a high level when a high level signal is input to the S terminal from the AND circuit 411, and sets the output of the Q terminal at a low level when a high level signal is input to a R (reset) terminal from the comparator 412.

[Operation Waveform of Switching Power Supply Apparatus]

Next, an operation and an operation waveform of the switching power supply apparatus 100 using the aforementioned power supply IC 109 is described. FIGS. 3A to 3I are graphs illustrating operation waveforms of the switching power supply apparatus 100. FIGS. 3A to 3C respectively illustrate input voltage waveforms of the S terminal and the R terminal, and an output voltage waveform of the Q terminal of the RS flip flop 413 of the power supply IC 109. FIGS. 3D and 3E respectively illustrate a voltage waveform of the voltage Vds between the drain terminal and the source terminal of the FET 107, and a current waveform of a current Id flowing in the drain terminal of the FET 107. FIG. 3F illustrates a current waveform of the current If of the diode 116 at the secondary side of the transformer 108. FIG. 3G illustrates a voltage waveform of the output voltage 118 which is output from the secondary side of the transformer 108. FIGS. 3H and 3I respectively illustrate waveforms of the output voltage of the buffer 415, and the voltage which is input to the CS terminal of the power supply IC 109. Further, horizontal axes in FIGS. 3A to 3I represent times, and t1 to t3 represent time instants (timings). Hereunder, operations of the power supply IC 109, the FET 107, the transformer 108 and the diode 116 are mainly described with use of FIGS. 3A to 3I.

(Timing 1)

Timing t1 in FIGS. 3A to 3I represents timing at which the high level signal is input to the S terminal of the RS flip flop 413 from the AND circuit 411 of the power supply IC 109 and the output of the Q terminal reaches a high level, as a result of which, the FET 107 is just brought into a conducting state (FIG. 3A, FIG. 3C). At this time, the drain current Id of the FET 107 linearly increases (FIG. 3E), and by the drain current Id of the FET 107, energy is stored in the transformer 108. Further, the voltage which is induced at the secondary side of the transformer 108 is the voltage which makes the anode side of the diode 116 negative, so that the current If does not flow in the diode 116 (FIG. 3F). Consequently, the output voltage 118 of the transformer 108 drops (FIG. 3G). Further, the output voltage of the buffer 415 of the power supply IC 109 gradually increases by the voltage which is input to the FB terminal via the photo coupler 115 (FIG. 3H). Further, the input voltage of the CS terminal also linearly increases similarly to the increase in the drain current Id of the FET 107 (FIG. 3E, FIG. 3I).

(Timing 2)

Next, timing 2 represents timing at which the input voltage of the CS terminal becomes higher than the output voltage of the buffer 415 of the power supply IC 109. At this time, a high level signal is input to the R terminal of the RS flip flop 413 from the comparator 412 (FIG. 3B). As a result, the output of the Q terminal of the RS flip flop 413, that is, the DRV terminal of the power supply IC 109 reduces to a low level (FIG. 3C), and the FET 107 is brought into a non-conducting state. Consequently, the drain current Id of the FET 107 does not flow (FIG. 3E). Further, the diode 116 at the secondary side of the transformer 108 has the voltage which makes the anode side positive, and therefore is brought into a conducting state, and the energy stored in the transformer 108 starts to flow as the current If of the diode 116 (FIG. 3F), whereby the output voltage 118 increases (FIG. 3G). Consequently, the output voltage of the buffer 415 gradually drops by the input voltage of the FB terminal of the power supply IC 109 via the photo coupler 115 (FIG. 3H). Further, the input voltage of the CS terminal of the power supply IC 109 also decreases to 0 V with stoppage (FIG. 3E) of the drain current Id of the FET 107 (FIG. 3I).

(Timing 3)

Subsequently, timing 3 represents timing at which the input voltage of the BOTTOM terminal of the power supply IC 109 becomes the reference voltage 408 or less, and the output voltage of the buffer 415 becomes higher than the reference voltage 410. A resistor 114 in FIG. 1 is a resistor for adjusting a voltage that is applied to the BOTTOM terminal in accordance with a detected voltage and a rated voltage of the power supply IC 109. At this time, a high level signal is output to the S terminal of the RS flip flop 413 from the AND circuit 411 of the power supply IC 109 (FIG. 3A), and the output of the Q terminal of the RS flip flop 413, that is, the DRV terminal of the power supply IC 109 reaches a high level (FIG. 3C). As a result, the FET 107 is brought into a conducting state (FIG. 3E). The timing 3 is the same timing as the timing 1, and the aforementioned series of circuit operations is continuously repeated.

[Operation of Switching Power Supply Apparatus at Low Load Time]

Next, an example of a switching operation that decreases a number of switching times of the FET 107 when the load 119 is a low load is described with use of the drawings. Note that a low load state means a state in which a current that is supplied to the load 119 is smaller as compared with a normal load state. FIGS. 4A to 4I are graphs illustrating operation waveforms of the switching power supply apparatus 100 at the low load time which is a second state. In FIGS. 4A to 4I, graphs of voltages and current waveforms illustrated in FIGS. 4A to 4G and 4I are the same graphs of the voltages and current waveforms as described in FIGS. 3A to 3G and 3I. Note that FIG. 4H is a graph of a voltage waveform of an input voltage of the FB terminal of the power supply IC 109. Horizontal axes in FIGS. 4A to 4I represent times, and t1 to t4 represent time instants (timings). Note that a dotted line in FIG. 4H shows a voltage of the reference voltage 410 of the comparator 409 of the power supply IC 109. Further, a voltage Vth1 in FIG. 4I represents a threshold value voltage of an input voltage of the CS terminal at the low load time, and when the input voltage of the CS terminal becomes the threshold value voltage Vth1 or more, a high level signal is output from the comparator 412. As a result, the output of the Q terminal of the RS flip flop 413 decreases to a low level from a high level, and the FET 107 is brought into a non-conducting state.

As illustrated in FIGS. 4A to 4I, operations at the timing t1 at the low load time are the same as in FIGS. 3A to 3I described above. At the low load time, the threshold value voltage Vth1 at which a high level signal is output from the comparator 412 is lower as compared with a case at a normal time that is the first state illustrated in FIGS. 3A to 3I. Consequently, the timing t2 at which the FET 107 is brought into a non-conducting state is earlier as compared with the cases of FIGS. 3A to 3I. Further, at the low load time, the input voltage of the FB terminal becomes lower as compared with at the normal time. Consequently, while the input voltage of the FB terminal is the reference voltage 410 of the comparator 409 or less, the output of the comparator 409 is at a low level, so that the Q terminal of the RS flip flop 413 keeps a low-level output. Even after the current If of the diode 116 does not flow at the timing t4, the output of the comparator 409 remains at a low level until the input voltage of the FB terminal becomes higher than the reference voltage 410, and the FET 107 is kept in a non-conducting state. When the input voltage of the FB terminal becomes higher than the reference voltage 410 at the timing t3, the output of the comparator 409 reaches a high level as in the timing t1, the output of the Q terminal of the RS flip flop 413 reaches a high level, and the FET 107 is brought into a conducting state. As described above, at the low load time, the FET 107 performs an intermittent operation as compared with at the normal operation time.

[Beat noise of Transformer at Low Load Time]

Figure 5A:
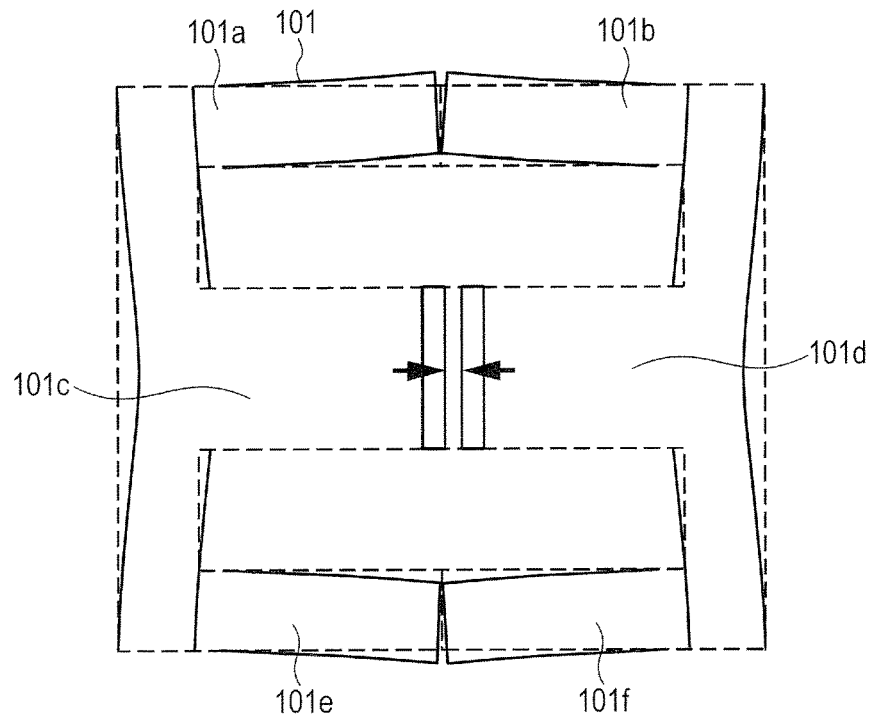
FIGS. 5A and 5B are schematic views illustrating states where a ferrite core of a transformer deforms by an electromagnetic force.
Figure 5B:
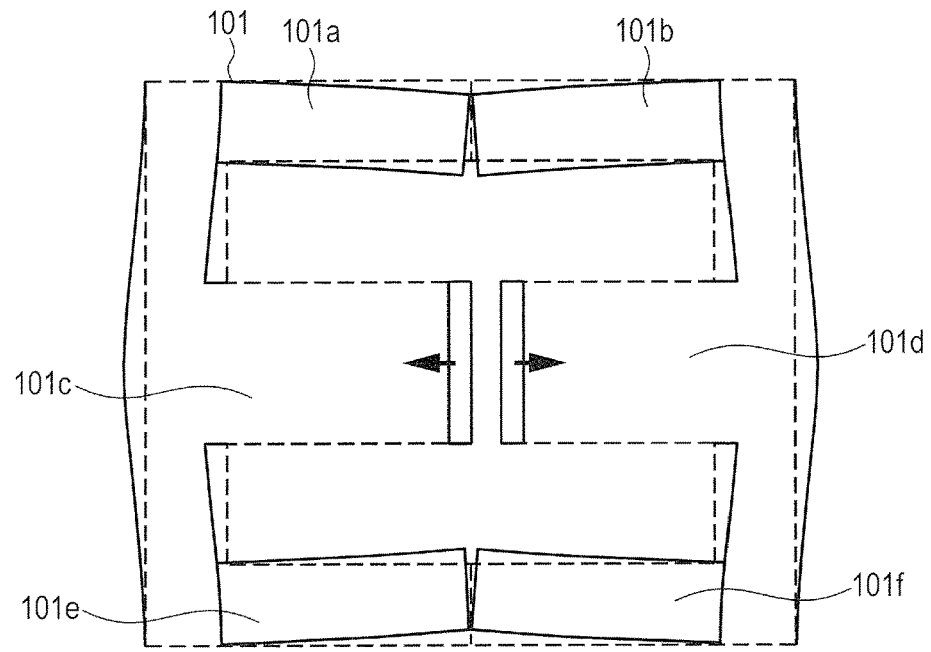

An example of a generation mechanism of a beat noise of the transformer 108 is described with use of the drawings. FIGS. 5A and 5B are schematic views illustrating states in which a ferrite core 101 of the transformer 108 deforms by electromagnetic force by a switching operation of the FET 107. FIG. 5A is a schematic view illustrating a state in which the FET 107 is brought into a conducting state, and the electromagnetic force is applied to the ferrite core 101. Note that solid lines show a shape of the ferrite core 101 at the time of the electromagnetic force being applied, and broken lines show an original shape of the ferrite core 101 at a time of no electromagnetic force being applied. FIG. 5B is a schematic view illustrating a state of the ferrite core 101 at a time of the FET 107 being brought into a non-conducting state and the electromagnetic force decreasing. Solid lines show a shape of the ferrite core 110 at a time of the electromagnetic force decreasing, and broken lines show an original shape of the ferrite core 101 at a time of no electromagnetic force being applied. Note that in the drawings, 101a to 101f indicate magnetic legs of the ferrite core 101.

As illustrated in FIG. 5A, the ferrite core 101 is distorted by an electromagnetic force at a time of switching the FET 107, and a beat noise is generated at this time. The magnetic force at this time works most greatly on central magnetic legs (101c, 101d) of the ferrite core 101, and is generated in directions (arrow directions) to attract mutual central magnetic legs facing each other. As a result, the ferrite core 101 receives the electromagnetic force and deforms as in FIG. 5A. When the FET 107 is brought into a non-conducting state, and the magnetic flux decreases, a restoring force works by elasticity of the ferrite core 101, and the ferrite core 101 deforms as in FIG. 5B. As a result that the ferrite core 101 deforms like this, outer magnetic legs (101a and 101b, 101e and 101f) vibrate to each other, and rub against each other, and thereby a beat noise is generated.

Further, loudness of the sound is correlated with an amount of energy stored in the transformer 108. Here, the energy stored in the transformer 108 is set as E[J], the inductance of the transformer 108 is set as L[H], the current flowing in the transformer 108 is set as I[A], and the time is set as t[sec]. The energy E that is stored in the transformer 108 can be expressed by the following expression (1).

$$E = \tfrac{1}{2} L \cdot I^2 \quad (1)$$

Further, a voltage V induced in the transformer 108 can be expressed by the following expression (2).

$$V = L \frac{dI}{dt} \quad (2)$$

Based on expression (2), the current I flowing in the transformer 108 can be expressed by the following expression (3).

Based on expression (3), the current flowing in the transformer 108 becomes larger as a conducting time period of the FET 107 is longer, and as the current flowing in the transformer 108 becomes larger, a magnetic field that is applied to the transformer 108 becomes larger, as a result of which, the beat noise of the transformer 108 becomes larger. Consequently, in the case of the switching power supply apparatus like this being included, when the switching frequency is close to the audible range at the low load time, the switching frequency become easy to hear as a beat noise, which becomes the problem at the light load time.

$$I = \int \frac{V}{L} dt \quad (3)$$

Embodiments are described hereunder.

[Configuration of Switching Power Supply Apparatus]

Figure 6:
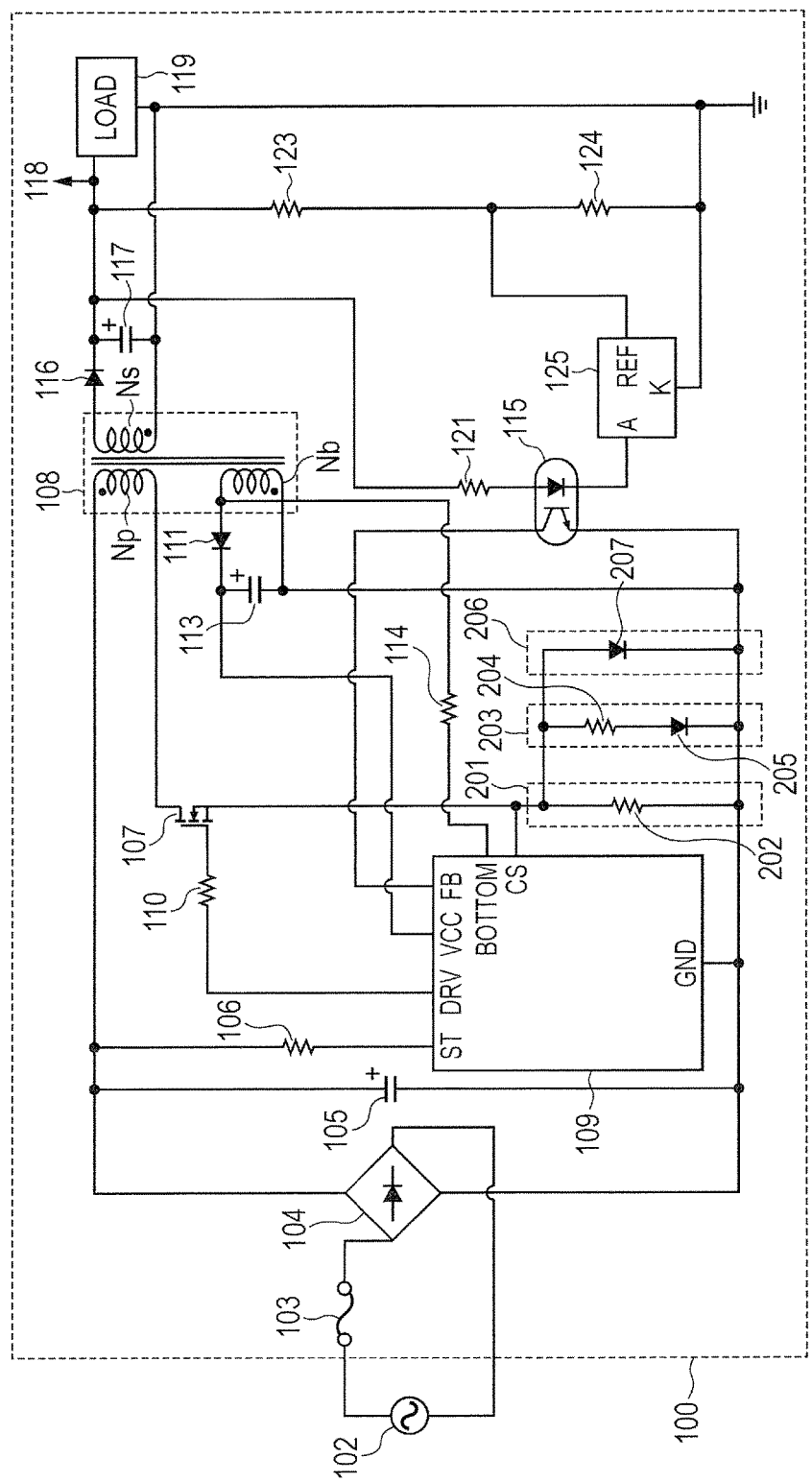
FIG. 6 is a diagram illustrating a circuit configuration of a switching power supply apparatus of embodiment 1.

FIG. 6 is a diagram illustrating a circuit configuration of the switching power supply apparatus 100 of embodiment 1. Differences between a circuit illustrated in FIG. 6 and the ordinary circuit in FIG. 1 are in the following two points. A first point is that a current detection unit 203 (a second detecting device) and a current detection unit 206 (a third detecting device) are connected in parallel to a current detection resistor 202 (a first resistor) that is a current detection unit 201 (a first detecting device) that is a detection unit. Note that the current detection unit 203 which is a detection unit is configured by a resistor 204 (a second resistor) and a diode 205 (a first diode), and the resistor 204 and the diode 205 are connected in series. Further, the current detection unit 206 which is a detection unit is configured by the diode 207 (a second diode). A second point is that while the current detection unit 201 is configured by the single current detection resistor 200 in FIG. 1 and the current detection unit 201 is configured by the single current detection resistor 202 in FIG. 6, a resistance value of the current detection resistor 202 in embodiment 1 is larger than a resistance value of the current detection resistor 200 in FIG. 1. Note that in FIG. 6, the same components as those in FIGS. 1 and 2 are assigned with the same reference signs, and explanation herein is omitted.

Figure 7:
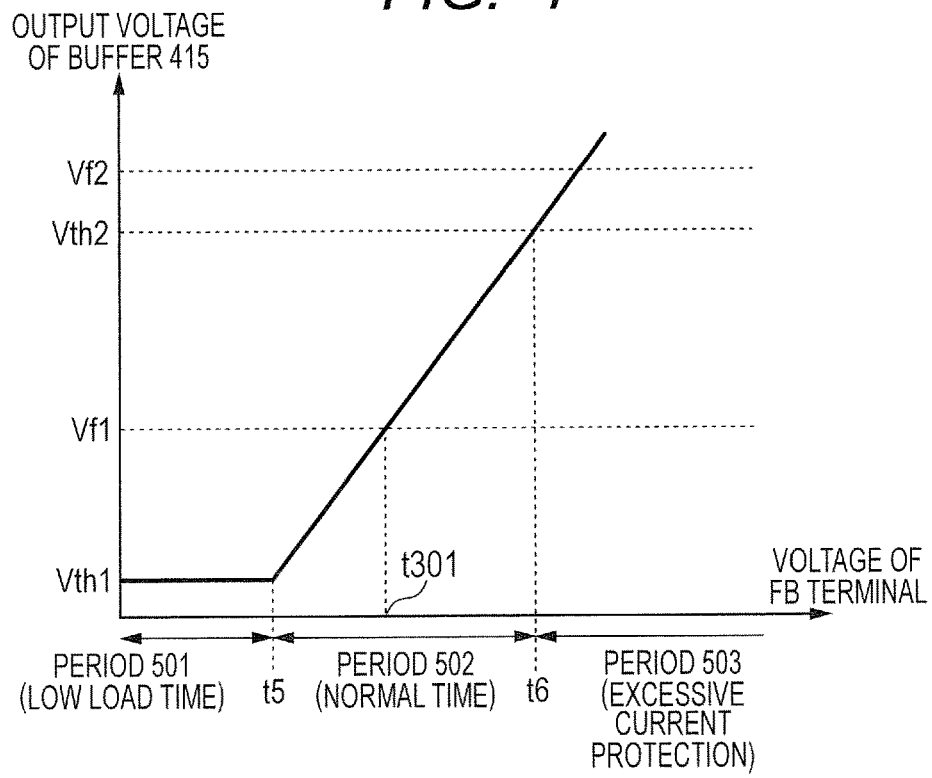
FIG. 7 is a graph illustrating a relationship between a voltage of an FB terminal of a power supply IC and a voltage of a buffer in embodiment 1.

Next, an example of an operation of the switching power supply apparatus 100 decreasing the number of switching times when the load 119 is a low load is described. FIG. 7 is a graph illustrating a relationship between the input voltage of the FB terminal and the output voltage of the buffer 415 of the power supply IC 109 described with FIG. 2. A vertical axis of FIG. 7 represents the output voltage of the buffer 415, and a horizontal axis represents the input voltage of the FB terminal (the voltage of the FB terminal in the drawing). In the switching power supply apparatus 100, three operation periods, that is, a period 501 that is a period at a low load time, a period 502 that is a period at a normal time, and a period 503 that is a period of excessive current protection are provided in accordance with the input voltage of the FB terminal of the power supply IC 109. Further, as the threshold value voltages of the output voltage of the buffer 415, the voltage Vth1 (a first output voltage) that is the threshold value voltage of the CS terminal at the low load time, and a voltage Vth2 (a second output voltage) of an excessive current threshold value voltage that is an excessive current detection voltage at the normal time are provided. Further, a voltages Vf1 (a third output voltage) and Vf2 (a fourth output voltage) are respectively forward direction voltages of the diode 205 of the current detection unit 203 and the diode 207 of the current detection unit 206 illustrated in FIG. 6. Further, t5, t6 and t301 represent time instants (timings).

The power supply IC 109 determines that the load is a low load when the input voltage of the FB terminal is at a predetermined voltage value or less, and fixes the output voltage of the buffer 415 to the voltage Vth1 in the period 501 which is the low load time. Consequently, the comparator 412 outputs a high level signal to the R terminal of the RS flip flop 413 at timing at which the voltage Vth1 which is output from the buffer 415 and the input voltage of the CS terminal coincide with each other as at the timing t2 in FIGS. 4A to 4I. Consequently, the output of the Q terminal of the RS flip flop 413 decreases to a low level from a high level and is output to the gate terminal of the FET 107 via the DRV terminal, and as a result, the FET 107 is brought into a non-conducting state.

Further, the period 502 which is the normal time is a period in which the power supply IC 109 switches the FET 107 on in accordance with a comparison result of the output voltage of the buffer 415 and the input voltage of the CS terminal. In the period 502, the FET 107 is brought into a non-conducting state at the timing at which the output voltage of the buffer 415 and the input voltage of the CS terminal coincide with each other as at the timing t2 in FIGS. 3A to 3I. Further, in the period 503 in which the drain current Id of the FET 107 is in an excessive current state, the output voltage of the buffer 415 becomes higher than the voltage Vth2 of the excessive current threshold value voltage. The comparator 412 resets the RS flip flop 413 at a timing t6 at which the voltage Vth2 which is the reference voltage 414 and the input voltage of the CS terminal coincide with each other, and brings the FET 107 into a non-conducting state. Note that in the present embodiment, the power supply IC 109 having characteristics in FIG. 7 is used.

Further, in the present embodiment, constants and the like of circuit elements of the switching power supply apparatus 100 illustrated in FIG. 6 are set at the following values. An alternating current voltage of the commercial alternating current power supply 102 is set as 100 Vrms, both end voltages of the smoothing capacitor 105 which is an electrolytic capacitor is set as 140 V, a primary inductance value of the transformer 108 is set as 200 μH, and a resistance value of the current detection resistor 202 is set as 0.2Ω. Further, a forward direction voltage Vf1 of the diode 205 is set as 0.3 V, a forward direction voltage Vf2 of the diode 207 is set as 0.6 V, and a resistance value of the current detection resistor 200 of the current detection unit 201 in FIG. 1 is set as 0.15Ω. Further, the voltage Vth1 which is the threshold value voltage of the CS terminal at the low load time is set as 0.1 V, and the voltage Vth2 of the excessive current threshold value voltage is set as 0.5 V. The relationship according to magnitude of the voltages Vth1 and Vth2, and the forward direction voltages Vf1 and Fv2 is the relationship of Vth1<Vf1<Vth2<Vf2.

[Operation of Switching Power Supply Apparatus]
(Circuit Operation at Low Load Time)

Figure 8:
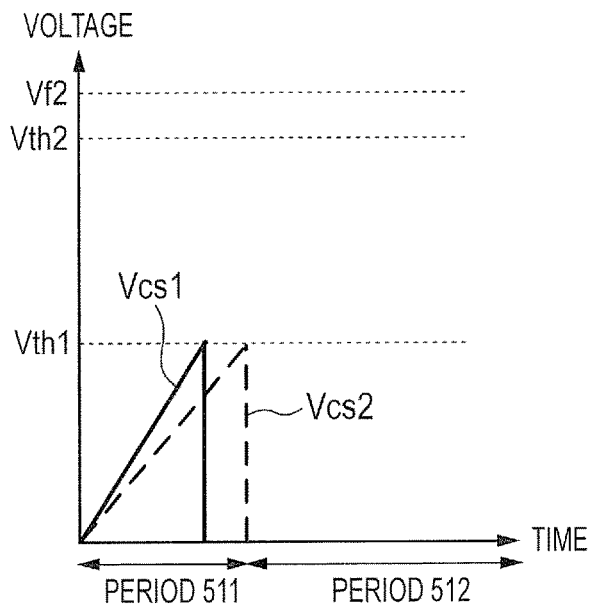
FIG. 8 is a graph illustrating a voltage waveform of a CS terminal of the power supply IC at a low load time of embodiment 1.

FIG. 8 is a diagram illustrating waveforms of the input voltage of the CS terminal of the power supply IC 109 in the ordinary circuit configuration (FIG. 1) and the input voltage of the CS terminal in the circuit configuration (FIG. 6) of the present embodiment at the low load time. A vertical axis in FIG. 8 represents the input voltage of the CS terminal of the power supply IC 109, and a horizontal axis represents time. A period 511 in FIG. 8 indicates a period in which the FET 107 is conducting at the low load time in the ordinary circuit configuration, and a period 512 indicates a period in which the FET 107 is not conducting at the low load time in the ordinary circuit configuration. Further, since the voltages Vth1 and Vth2, and the forward direction voltage Vf2 are described above, explanation herein is omitted.

In FIG. 8, an input voltage waveform Vcs1 of the CS terminal shown by a solid line is the input voltage waveform of the CS terminal of the circuit configuration (FIG. 6) of the present embodiment, and an input voltage waveform Vcs2 of the CS terminal shown by a broken line is the input voltage waveform of the CS terminal of the power supply IC 109 in the ordinary circuit configuration (FIG. 1). As described above, the resistance value of the current detection resistor 202 of the current detection unit 201 of the present embodiment is larger than the resistance value of the current detection resistor 200 of the ordinary circuit configuration. Consequently, a speed at which the input voltage waveform Vcs1 to the CS terminal in the present embodiment increases is higher as compared with that of the ordinary circuit, so that a timing at which the input voltage waveform Vcs1 reaches the voltage Vth1 of the threshold value voltage is earlier as compared with the input voltage waveform Vcs2 of the CS terminal of the ordinary circuit. When the input voltage waveform Vcs1 to the CS terminal reaches the voltage Vth1 of the threshold value voltage, the FET 107 is brought into a non-conducting state, and the input voltage waveform Vcs1 to the CS terminal reaches 0 V. As a result, a conducting time period of the FET 107 becomes shorter as compared with a conducting time period (Vcs2) in the case of the ordinary circuit configuration, and a peak current flowing in the transformer 108 can be decreased, so that the beat noise of the transformer 108 can be reduced more than in the conventional apparatus. Note that the reason why in the current detection resistor 202 of the circuit configuration of the present embodiment, the resistance value can be made larger than the resistance value in the current detection resistor 200 of the ordinary circuit configuration is described later.

Here, the both end voltages of the smoothing capacitor 105 using an electrolytic capacitor is set as the voltage Vdc, the excessive current threshold value voltage at the low load time is set as the voltage Vth1, the primary inductance of the transformer 108 is set as L, the current flowing into the primary side of the transformer 108 is set as I, and the time is set as t. Further, a resistance value of the current detection resistor 200 (FIG. 1) or the current detection resistor 202 (FIG. 6) of the current detection unit 201 is set as a resistance R. Then, the voltage Vdc can be expressed by the following expression (4), based on expression (2) mentioned above.

$$V_{dc} = L\frac{dI}{dt} \quad (4)$$

A conducting time period ton of the FET 107 can be expressed by the following expression (5), based on expression (4).

Based on expression (5), it is found that as the resistance value R of the current detection resistor is larger, the conducting period ton of the FET 107 becomes shorter. A peak current Ipk that flows in the transformer 108 at this time is approximately 0.67 A(=Vth1/R=0.1(V)/0.15(Ω)) in the case of the ordinary circuit configuration, when the peak current Ipk is calculated by replacing the voltage Vth2 in expression (6) described later with the voltage Vth1. Meanwhile, the peak current Ipk which flows in the transformer 108 in the case of the present embodiment is approximately 0.5 A(=Vth1/R=0.1(V)/0.2(Ω)). In this way, the circuit configuration of the present embodiment can make the peak current Ipk flowing in the transformer 108 smaller as compared with the ordinary circuit configuration.

$$t_{on} = \frac{L \cdot V_{th1}}{V_{dc} \cdot R} \quad (5)$$

(Circuit Operation at Normal Time)

Subsequently, a circuit operation in the case of the load 119 being in a load state at the normal time (the period 502 in FIG. 7) between the low load time and the excessive current protection time is described with use of the drawings. FIGS. 9A to 9E are graphs illustrating operation waveforms at the normal time of the switching power supply apparatus 100 in FIG. 6. FIG. 9A illustrates an output voltage waveform of the Q terminal of the RS flip flop 413 of the power supply IC 109, FIG. 9B illustrates a voltage waveform of the voltage Vds between the drain terminal and the source terminal of the FET 107, and FIG. 9C illustrates a current waveform of the current Id flowing in the drain terminal. FIG. 9D illustrates the output voltage waveform of the buffer 415 of the power supply IC 109, and FIG. 9E illustrates an input voltage waveform of the CS terminal. Further, horizontal axes in FIGS. 9A to 9E represent times, and t301 represents a time instant (timing).

In the circuit configuration illustrated in FIG. 6 in the present embodiment, the forward direction voltage (0.3 V) of the diode 205 of the current detection unit 203 is lower than the voltage Vth2 (0.5 V) which is the threshold value of detecting an excessive current at the normal time. Consequently, when the voltage (hereunder, referred to as the input voltage Vcs of the CS terminal) which is applied to the current detection unit 203 becomes the forward direction voltage Vf1 of the diode 205 or more (the timing t301 in FIGS. 9A to 9E), a current starts to flow in the current detection unit 203. As the diode for use in the diode 205, for example, a shottky-barrier diode or the like is cited.

In the case of the ordinary circuit configuration, the graph of the input voltage of the CS terminal is such that the input voltage of the CS terminal increases with the same gradient until the input voltage of the CS terminal reaches the output voltage of the buffer 415 (FIG. 3H, FIG. 3I), whereas in FIGS. 9A to 9E, a gradient of the waveform of the input voltage of the CS terminal changes at the timing t301. In the circuit in FIG. 6, the input voltage Vcs of the CS terminal is in a waveform that is detected by the current detection resistor 202 until the voltage value reaches the forward direction voltage Vf1 of the diode 205. However, when the input voltage Vcs of the CS terminal becomes the forward direction voltage Vf1 or more, the diode 205 of the current detection unit 203 is brought into a conducting state. As a result, the current value of the current Id flowing in the drain terminal of the FET 107 is input to the CS terminal as the voltage that is detected by combined resistance of the current detection resistor 202, the resistor 204 and the diode 205. Note that at the normal time, the forward direction voltage Vf2 of the diode 207 is higher than the voltage Vth2 which is the threshold value of the excessive current detection, and therefore, the diode 207 is not brought into a conducting state, so that the diode 207 is not included in the combined resistance for detecting the current Id.

Figure 10A:
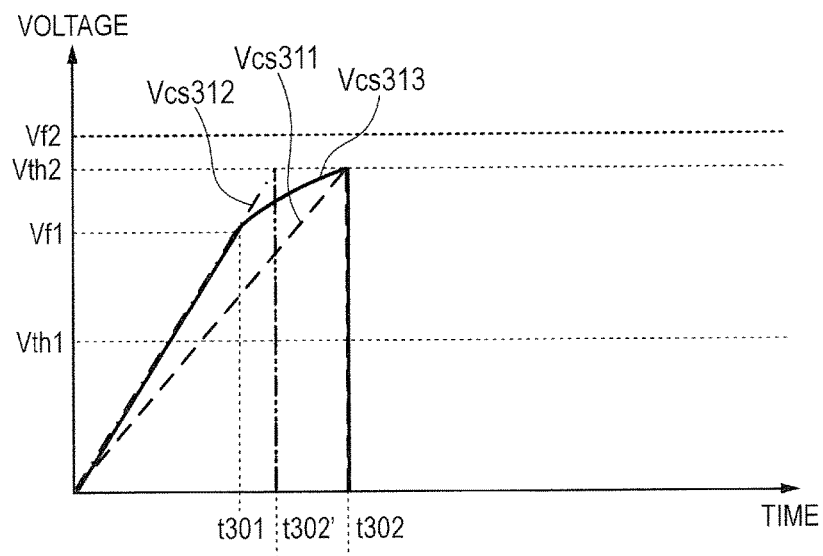
FIG. 10A is a graph illustrating an input voltage of the CS terminal of embodiment 1.
Figure 10B:
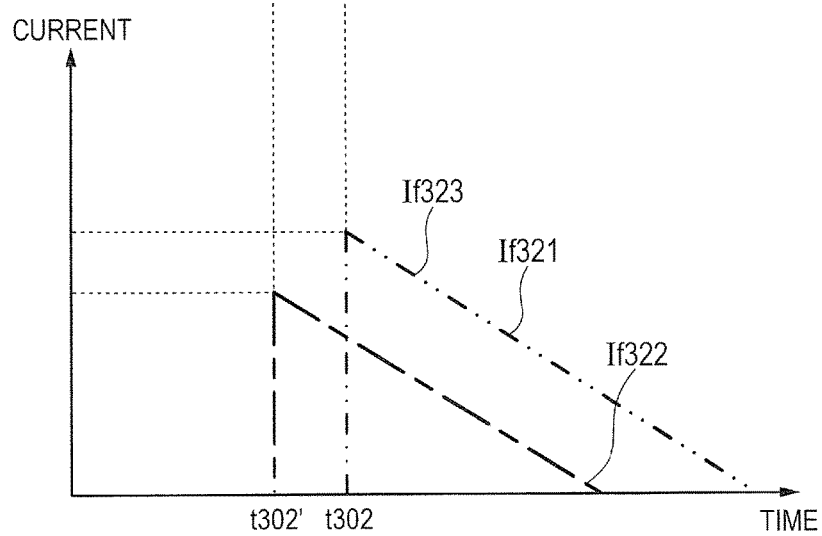
FIG. 10B is a graph illustrating a current waveform of a diode.

FIG. 10A illustrates input voltage waveforms of the CS terminals in the case of the ordinary circuit configuration (FIG. 1), the case where only the resistance value of the current detection resistor 200 is increased in the ordinary circuit configuration, and the case of the circuit configuration (FIG. 6) in the present embodiment, and FIG. 10B illustrates current waveforms flowing in the diodes 116 in these cases. The vertical axis in FIG. 10A represents the input voltage of the CS terminal and the vertical axis in FIG. 10B represents the current value of the diode 116. Horizontal axes in FIG. 10A and FIG. 10B represent times, and t301, t302 and t302' represent time instants (timings). A voltage waveform Vcs311 (shown by a broken line) represents an input voltage waveform of the CS terminal in the ordinary circuit configuration, and a voltage waveform Vcs312 (shown by an alternate long and short dash line) represents an input voltage waveform of the CS terminal at the time of the resistance value of the current detection resistor 200 being increased in the ordinary circuit configuration. Further, a voltage waveform Vcs313 (shown by a solid line) represents an input voltage waveform of the CS terminal in the circuit configuration of the present embodiment. A current waveform If321 (shown by a two-dot chain line) shows a current waveform of the diode 116 in the ordinary circuit configuration, and a current waveform If322 (shown by an alternate long and short dash line) represents a current waveform of the diode 116 at the time of the resistance value of the current detection resistor 200 being increased from the ordinary circuit configuration. A current waveform If323 (shown by a two-dot chain line) is a current waveform of the diode 116 in the circuit configuration of the present embodiment.

Since a state of the input voltage waveform of the CS terminal in FIG. 10A is controlled by the voltage Vth2 which is the excessive current detection threshold value, a state in which maximum electric power can be supplied to the load 119 is at the time of the input voltage of the CS terminal being the voltage Vth2 (timing t6 in FIG. 7). Accordingly, in the case of the voltage waveform Vcs311 in the case of the ordinary circuit configuration, and in the case of the voltage waveform Vcs312 in the case of the resistance value of the current detection resistor 200 being increased in the ordinary circuit configuration, the voltages reach the voltage Vth2 respectively at the timing t302 and the timing t302'. Then, the FET 107 is brought into a non-conducting state, the input voltage of the CS terminal reduces to 0 V, and the diode 116 at the secondary side of the transformer 108 is brought into a conducting state. FIG. 10B illustrates the current waveforms of the current If flowing in the diodes 116 after the diodes 116 are brought into a conducting state at the timings t302 and t302'. It is found that by only increasing the resistance value of the current detection resistor 202 as shown by the current waveform If322, an average current amount of the current If flowing in the diode 116 is smaller as compared with the current waveform If321 in the ordinary circuit configuration, so that the electric power that can be supplied to the load 119 is small. Further, at this time, at the timings t302 and t302', the forward direction voltage Vf2 of the diode 207 of the current detection unit 206 is 0.6 V, and is higher than 0.5 V of the threshold value voltage Vth2 of excessive current detection at the normal time, so that the diode 207 does not conduct.

As above, in the ordinary circuit configuration, when the resistance value of the current detection resistor 200 is only increased, the resistance value of the load 119 at which the excessive current protection works needs to be increased. Further, the load specifications necessary for the switching power supply apparatus 100 are set in advance, so that there is a restriction that the resistance value of the current detection resistor 200 cannot be made larger than a predetermined resistance value.

In the present embodiment, the same load specifications can be made by the forward direction voltage Vf1 of the diode 205 of the current detection unit 203 and the resistance value of the resistor 204. The resistor 204 and the diode 205 with which the combined resistance value of the resistor 202, the resistor 204 and the diode 205 becomes the same as the resistance value of the resistor 200 are selected in order that excessive current protection is started up at the same timing t302 as the voltage waveform Vcs311 of the CS terminal in the case of the ordinary circuit configuration. Thereby, the energy stored in the transformer 108 in the present embodiment becomes the same as in the case of the ordinary circuit configuration, so that average currents of the current waveform If321 flowing in the diode 116 in the case of the ordinary circuit configuration and the current waveform If323 in the case of the present embodiment become equal to each other. As a result, in the present embodiment, as for the electric power that can be supplied to the load 119, the same electric power as the electric power in the case of the ordinary circuit configuration can be supplied to the load 119, and a beat noise of the transformer at the low load time can be reduced without changing the value of the load 119 on which excessive current protection works.

Here, the resistance value of the current detection resistor 200 is set as R1, the resistance value of the current detection resistor 202 is set as R1', the resistance value of the resistor 204 is set as R2, the voltage drop of the diode 205 is set as Vf1, and the current peak value of the drain current Id of the FET 107 at the excessive current protection time is set as Ipk. When the current peak value flowing in the current detection unit 201 in the circuit configuration of the present embodiment is set as I1, and the current peak value flowing in the current detection unit 203 is set as I2, the current peak values Ipk, I1, I2 and the resistance value R2 can be respectively expressed by the following expressions (6), (7), (8) and (9).

$$I_{pk} = \frac{V_{th2}}{R_1} \tag{6}$$

$$I_1 = \frac{V_{th2}}{R_1'} \tag{7}$$

$$I_2 = I_{pk} - I_1 \tag{8}$$

$$R_2 = \frac{V_{th2} - V_{f1}}{I_2} \tag{9}$$

In the present embodiment, based on expression (6), the current peak value Ipk is calculated as 3.33 A(ampere) (=Vth2/R1=0.5(V)/0.15(Ω)). Likewise, based on expression (7), the current peak value I1 is calculated as 2.5 A(=Vth2/R1'=0.5(V)/0.2(Ω)). Further, based on expression (8), the current peak value I2 is calculated as 0.83 A(=Ipk−I1=3.33(A)−2.5(A)). Further, based on expression (9), the resistance value R2 is calculated as 0.24Ω(=(Vth2−Vf1)/I2=(0.5(V)−0.3(V))/0.83(A)). Note that in the present embodiment, the forward direction voltage Vf1 of the diode 205 is dealt as a fixed value in order to simplify the explanation, but in reality, the forward direction voltage Vf1 changes in accordance with the temperature and the forward direction current, and therefore does not always correspond to expression (9). Consequently, like the voltage waveform Vcs313 in FIG. 10A, the input voltage waveform of the CS terminal changes curvilinearly after the timing t301.

[Operation of Switching Element at Incidental failure Time]

Figure 11:
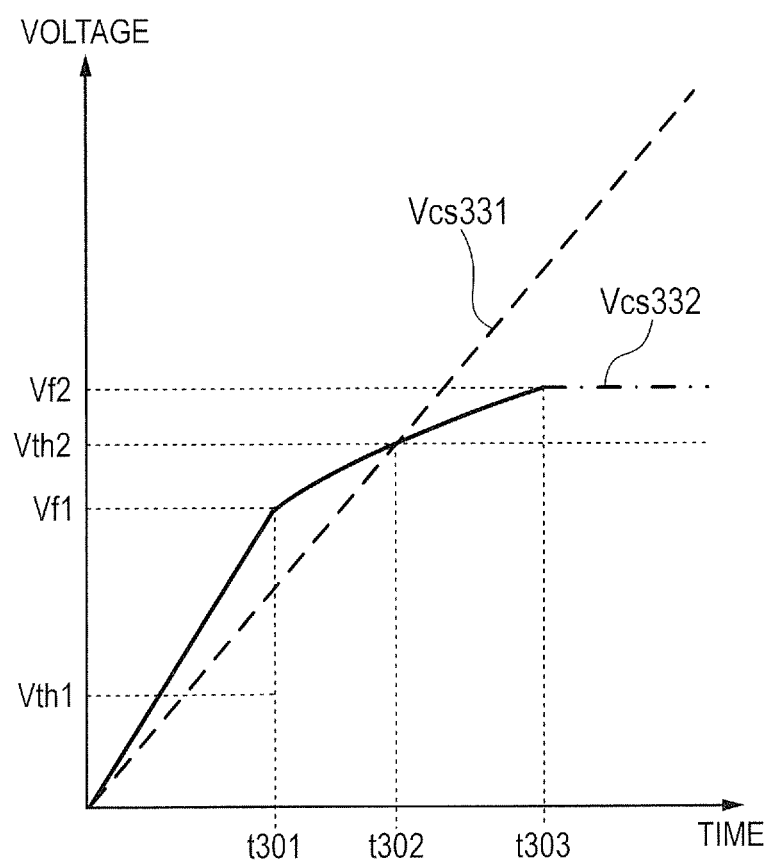
FIG. 11 is a graph illustrating an operation waveform at a time of an incidental failure of an FET of embodiment 1.

Next, as an example of an incidental failure, circuit protection in a case where the drain terminal and the gate terminal of the FET 107 are short-circuited due to some failure and the state is kept is described with use of the drawing. FIG. 11 is a graph illustrating voltage waveforms of input voltages of the CS terminal at the normal time, at the excessive current detection time, and in the case where the drain terminal and the gate terminal of the FET 107 are short-circuited of the switching power supply apparatus 100. A vertical axis in FIG. 11 represents the input voltage of the CS terminal, and a horizontal axis represents time (timing). A broken line shows a voltage waveform in the ordinary circuit configuration (FIG. 1), a solid line shows a voltage waveform in a case where the FET 107 is normal in the circuit configuration (FIG. 6) of the present embodiment, and an alternate long and short dash line shows a voltage waveform in a case where the FET 107 is short-circuited in the circuit configuration (FIG. 6) of the present embodiment. A timing t303 shows a timing at which the input voltage of the CS terminal reaches the same voltage value as the forward direction voltage Vf2 of the diode 207 of the current detection unit 206. Note that the voltages th1, Vf1 and Vth2 and the timings t301 and t302 are described above, and explanation herein is omitted.

When the drain terminal and the gate terminal of the FET 107 are short-circuited (shorted) in the circuit in FIG. 6 of the present embodiment, the direct current voltage of substantially the voltage Vdc is applied between the gate terminal and the source terminal of the FET 107, though the voltage drops in the primary winding Np of the transformer 108. When the power supply IC 109 detects that the input voltage of the CS terminal reaches the voltage Vth2 which is the excessive current threshold value at the timing t302 in FIG. 11 at this time, the power supply IC 109 resets the RS flip flop 413, reduces the output from the Q terminal to a low level, and brings the FET 107 into a non-conducting state. However, both end voltage Vdc of the smoothing capacitor 105 which is the electrolytic capacitor is kept supplied to the FET 107, so that the FET 107 continues a conducting state. As shown by the voltage waveform Vcs331 in the drawing, in the case of the ordinary circuit configuration, the drain current Id of the FET 107 continues to increase even after the timing t302, and an excessive voltage is applied to the current detection resistor 200, which becomes a cause of the failure of the power supply IC 109.

In the circuit configuration of the present embodiment, the voltage of the voltage waveform Vcs332 reaches the forward direction voltage Vf2 of the diode 207 at a timing t303, so that the diode 207 starts to be conductive, and the voltage is clamped to the forward direction voltage Vf2 of the diode 207. As a result, electric power that is applied to the current detection resistor 202 is also restricted (Vcs332 in the drawing). Further, in the circuit configuration of the present embodiment, when the diode 207 is brought into a conducting state, a current loop in which an alternating current voltage returns to the rectifying diode bridge 104 via the rectifying diode bridge 104, the primary winding Np of the transformer 108, the FET 107 and the diode 207 is formed. An excessive current at this time continuously flows, whereby the current fuse 103 provided in the power supply line of the commercial alternating current power supply 102 is melted and cut to be in an open state, and can prevent breakage of the other circuit elements.

As described above, according to the present embodiment, a vibration sound generated from the transformer at the low load operation time is reduced, and breakage of the peripheral components by the incidental failure of the switching element can be minimized.

In embodiment 1, the example of the current detection unit being configured by the resistors and the diode is described, whereas in embodiment 2, an example of a current detection unit being configured by resistors and a circuit using a transistor that is a switching element will be described.

[Configuration and Operation of Switching Power Supply Apparatus]

Figure 12:
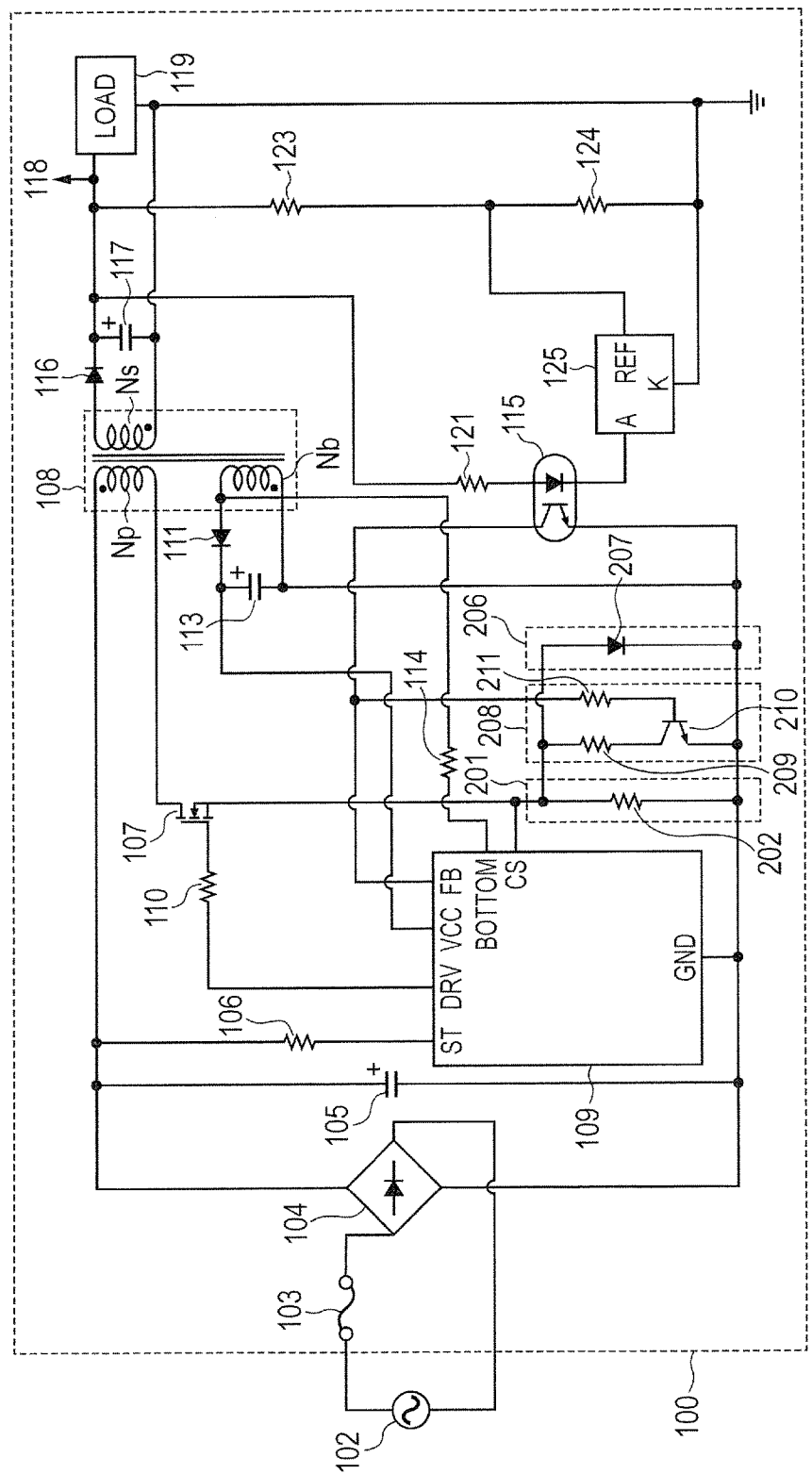
FIG. 12 is a diagram illustrating a circuit configuration of a switching power supply apparatus of embodiment 2.

FIG. 12 is a diagram illustrating a circuit configuration of the switching power supply apparatus 100 in the present embodiment. Note that the same components as the components in embodiment 1 are assigned with the same reference signs, and explanation is omitted. A difference in circuit configuration from FIG. 6 illustrating the circuit configuration of embodiment 1 is a point that the current detection unit 203 in embodiment 1 is changed to a current detection unit 208 in the present embodiment. The current detection unit 208 is configured by a resistor 209 (a second resistor), a resistor 211 and a transistor 210. One end of the resistor 211 is connected to the FB terminal of the power supply IC 109, and the other end is connected to a base terminal of the transistor 210. Further, one end of the resistor 209 is connected to the CS terminal, the resistor 202 and the anode terminal of the diode 207, and the other end is connected to a collector terminal of the transistor 210. Note that for the resistor 209, a resistance value with which the combined resistance value of the resistor 202 and the resistor 209 becomes the same resistance value as the resistor 200 in the ordinary circuit configuration is selected.

Figure 13:
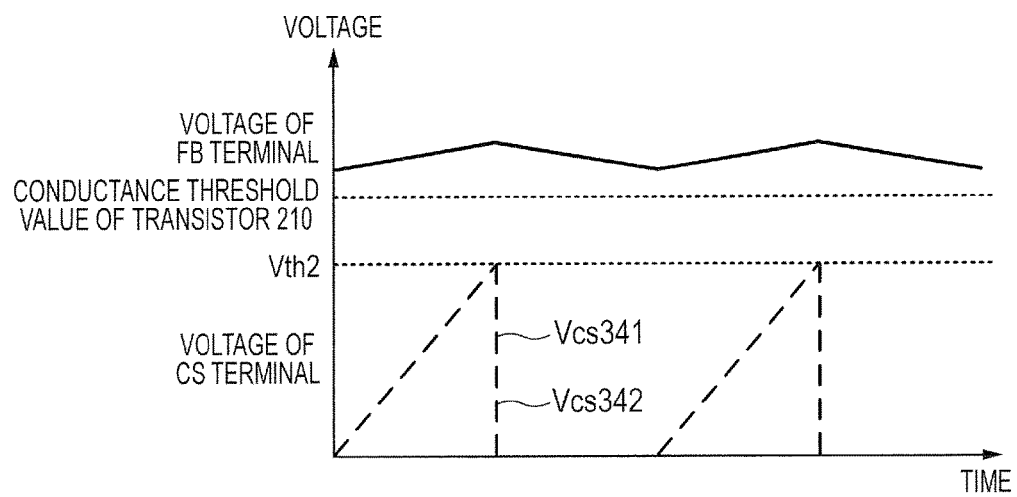
FIG. 13 is a graph illustrating an operation waveform at a normal time of the switching power supply apparatus of embodiment 2.

At the low load time, the input voltage of the FB terminal of the power supply IC 109 is lower than a conductance threshold value (0.7 V in the present embodiment) at which the transistor 210 is turned on, so that the transistor 210 is not turned on, and remains in an off state. Accordingly, an operation of the current detection unit 208 at the low load time is the same as the operation of the current detection unit 203 in embodiment 1. Next, at the normal time at which the input voltage of the FB terminal becomes high, a current flows into the base terminal of the transistor 210 via the resistor 211, the transistor 210 is brought into an on state, and electrical conduction is established between the collector terminal and the emitter terminal, and the resistor 209. FIG. 13 is a diagram illustrating voltage waveforms at this time (at the normal time). In FIG. 13, a solid line shows a voltage waveform of the input voltage of the FB terminal of the power supply IC 109, a broken line shows the input voltage of the CS terminal of the power supply IC 109, and a dotted line shows the voltage Vth2 which is a conductance threshold value of the transistor 210 in FIG. 12, i.e., the threshold value of excessive current detection. Further, a vertical axis represents a voltage, and a horizontal axis represents a time (timing). As illustrated in FIG. 13, a circuit operation at the normal time differs from the case of embodiment 1, and the input voltage of the FB terminal is always higher than the conductance threshold value of the transistor 210, so that a gradient of the voltage waveform Vcs342 of the CS terminal does not change at the timing t301 in FIGS. 9A to 9E. As a result, the voltage waveform Vcs342 of the input voltage of the CS terminal in the present embodiment becomes a similar waveform to the voltage waveform Vcs341 of the CS terminal in the ordinary circuit configuration.

As described above, according to the present embodiment, the vibration sound generated from the transformer at the low load operation time is reduced, and breakage of the peripheral components due to an incidental failure of the switching element can be minimized.

The switching power supply apparatuses described in embodiments 1 and 2 are applicable as the low voltage power supply of the image forming apparatus, for example, that is, the power supply that supplies electric power to a controller (control unit) and a drive unit such as a motor. Hereunder, a configuration of an image forming apparatus to which the switching power supply apparatuses in embodiments 1 and 2 are applied is described.

[Configuration of Image Forming Apparatus]

Figure 14:
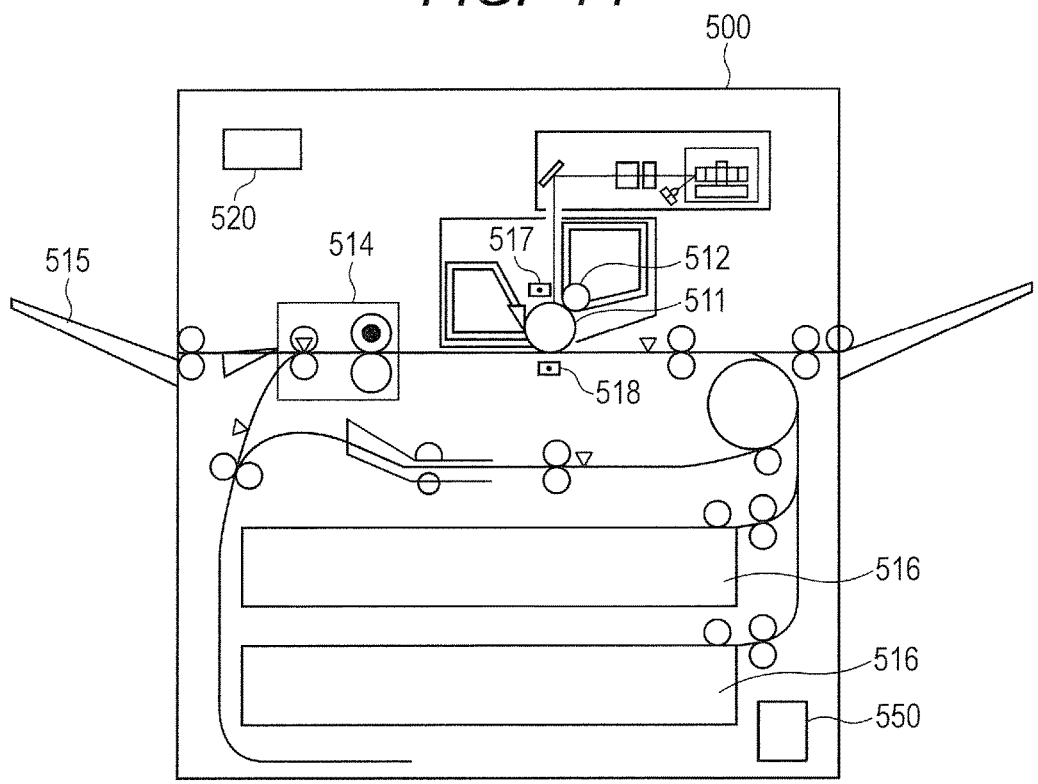
FIG. 14 is a schematic view of an image forming apparatus of embodiment 3.

As an example of the image forming apparatus, a laser beam printer is described by being cited as an example. FIG. 14 illustrates a schematic configuration of the laser beam printer which is an example of an electrophotography type printer. A laser beam printer 500 includes a photosensitive drum 511 as an image bearing member on which an electrostatic latent image is formed, an electrifying unit 517 (electrifying unit) that uniformly electrifies the photosensitive drum 511 and a developing unit 512 (developing unit) that develops the electrostatic latent image formed on the photosensitive drum 511 with toner. A toner image developed on the photosensitive drum 511 is transferred onto a sheet (not illustrated) as a recording material supplied from a cassette 516 by a transfer unit 518 (transfer unit), and the toner image transferred onto the sheet is fused by a fixing device 514 and the sheet is ejected to a tray 515. The photosensitive drum 511, the electrifying unit 517, the developing unit 512 and the transfer unit 518 correspond to an image forming unit. Further, the laser beam printer 500 includes a switching power supply apparatus 550 that is described in embodiments 1 and 2. Note that the image forming apparatus to which the switching power supply apparatus 550 in embodiments 1 and 2 is applicable is not limited to what is illustrated in FIG. 14, but may be an image forming apparatus including a plurality of image forming units, for example. Further, the image forming apparatus may include a primary transfer unit that transfers the toner image on the photosensitive drum 511 onto an intermediate transfer belt, and a secondary transfer unit that transfers the toner image on the intermediate transfer belt to a sheet.

The laser beam printer 500 includes a controller 520 that controls an image forming operation by the image forming unit, and a sheet transfer operation, and the switching power supply apparatus 550 described in embodiments 1 and 2 supplies electric power to the controller 520, for example. Further, the switching power supply apparatus 550 described in embodiments 1 and 2 supplies electric power to a drive unit such as a motor for rotating the photosensitive drum 511, or driving various rollers and the like that transfer the sheet. The conducting time period of the FET 107 of the switching power supply apparatus becomes shorter as compared with the conducting time period in the case of the ordinary circuit configuration, and the peak current flowing into the transformer 108 can be decreased, so that a beat noise of the transformer 108 can be reduced more than in the conventional apparatus. Further, even when the FET 107 fails, and the gate terminal and the drain terminal are short-circuited, the voltage generated by the current flowing in the FET 107 is clamped to the forward direction voltage Vf2 of the diode 207, and electric power applied to the current detection resistor 202 is also restricted. Thereby, the voltage applied to the power supply IC 109 is restricted, and component breakage can be avoided.

As described above, according to the present embodiment, the vibration sound generated from the transformer at the low load operation time in the image forming apparatus is reduced, and breakage of the peripheral components due to an incidental failure of the switching element can be minimized. Note that the low load time in the image forming apparatus is a state where the image forming apparatus is waiting without executing image formation, whereas the normal load time is a state where the image forming apparatus is executing image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-227808, filed Nov. 24, 2016, which is hereby incorporated by reference herein in its entirety.

What is claimed is:

1. A power supply apparatus comprising:
a transformer having a primary winding and a secondary winding;
a switching element connected on a primary side of the transformer to switch a current flowing in the primary winding of the transformer, wherein the power supply apparatus is operable in a first state of outputting a predetermined voltage from the secondary winding, and a second state of outputting a voltage lower than the predetermined voltage;
a detecting unit that has a first detecting circuit connected in series to the switching element, and a second detecting circuit and a third detecting circuit each of which are connected to the first detecting circuit in parallel with each other, detects a current flowing into the primary winding, and outputs a voltage corresponding to the current; and
a control unit that controls a switching operation of the switching element, in accordance with the voltage which is output by the detecting unit,
wherein an output voltage which the detecting unit outputs to the control unit includes a first output voltage at which the control unit stops the switching operation of the switching element at a time of the second state, a second output voltage at which the control unit stops the switching operation of the switching element at a time of the first state, a third output voltage at which the second detecting circuit is brought into a conducting state, and a fourth output voltage at which the third detecting circuit is brought into a conducting state, and satisfies a relationship of:
the first output voltage<the third output voltage<the second output voltage<the fourth output voltage.

2. The power supply apparatus according to claim 1, wherein the first detecting circuit has a first resistor,
wherein the second detecting circuit has a second resistor and a first diode, and
wherein the second resistor and the first diode are connected in series.

3. The power supply apparatus according to claim 2, wherein the third output voltage is a forward direction voltage of the first diode.

4. The power supply apparatus according to claim 3, wherein in a conducting state of the first diode, a combined resistance value of the first resistor, the second resistor and the first diode is smaller than a resistance value of the first resistor.

5. The power supply apparatus according to claim 1,
wherein the first detecting circuit has a first resistor,
wherein the second detecting circuit has a second resistor and a transistor,
wherein the second resistor is connected to a collector terminal of the transistor, and
wherein the transistor is in an off state at a time of the second state, and in an on state at a time of the first state.

6. The power supply apparatus according to claim 5, wherein a combined resistance value of the first resistor and the second resistor is smaller than a resistance value of the first resistor.

7. The power supply apparatus according to claim 4, wherein the third detecting circuit has a second diode.

8. The power supply apparatus according to claim 7, wherein the fourth output voltage is a forward direction voltage of the second diode.

9. The power supply apparatus according to claim 1, wherein a current supplied to a load from the secondary winding in the second state is smaller than a current supplied to the load from the secondary winding in the first state.

10. An image forming apparatus comprising:
an image forming unit for forming an image on a recording material; and
a power supply apparatus that supplies electric power to the image forming apparatus,
wherein the power supply apparatus including:
a transformer having a primary winding and a secondary winding; and
a switching element connected on a primary side of the transformer to switch a current to the primary winding of the transformer, wherein the power supply apparatus is operable in a first state of outputting a predetermined voltage from the secondary winding, and a second state of outputting a voltage lower than the predetermined voltage;
a detecting unit that has a first detecting circuit connected in series to the switching element, and a second detecting circuit and a third detecting circuit, each of which are connected to the first detecting circuit in parallel with each other, detects a current flowing into the primary winding, and outputs a voltage corresponding to the current; and a control unit that controls a switching operation of the switching element, in accordance with the voltage which is output by the detecting unit, wherein an output voltage which the detecting unit outputs to the control unit includes a first output voltage at which the control unit stops the switching operation of the switching element at a time of the second state, a second output voltage at which the control unit stops the switching operation of the switching element at a time of the first state, a third output voltage at which the second detecting circuit is brought into a conducting state, and a fourth output voltage at which the third detecting circuit is brought into a conducting state, and satisfies a relationship of:

the first output voltage<the third output voltage<the second output voltage<the fourth output voltage.

11. The image forming apparatus according to claim 10, wherein a current supplied to a load from the secondary winding in the second state is smaller than a current supplied to the load from the secondary winding in the first state.

12. The image forming apparatus according to claim 11, wherein the first state is a state where image formation is executed in the image forming unit, and the second state is in a stand-by state without executing image formation in the image forming unit.

13. The image forming apparatus according to claim 10, wherein power consumption of the image forming apparatus in the second state is less than power consumption of the image forming apparatus in the first state.

14. The image forming apparatus according to claim 11, wherein power consumption of the image forming apparatus in the second state is less than power consumption of the image forming apparatus in the first state.

15. The image forming apparatus according to claim 12, wherein power consumption of the image forming apparatus in the second state is less than power consumption of the image forming apparatus in the first state.

16. The image forming apparatus according to claim 10, further comprising:

a controller configured to control an operation of the image forming unit; and a drive unit configured to drive the image forming unit, wherein the power supply apparatus supplies the controller and the drive unit.

17. The image forming apparatus according to claim 11, further comprising:

a controller configured to control an operation of the image forming unit; and a drive unit configured to drive the image forming unit, wherein the power supply apparatus supplies the controller and the drive unit.

18. The image forming apparatus according to claim 12, further comprising:

a controller configured to control an operation of the image forming unit; and a drive unit configured to drive the image forming unit, wherein the power supply apparatus supplies the controller and the drive unit.

* * * * *